(12) United States Patent
Inoue (10) Patent No.: US 8,378,804 B2
(45) Date of Patent: Feb. 19, 2013

(54) ACTIVE ACOUSTIC CONTROL APPARATUS

(75) Inventor: Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 12/957,396

(22) Filed: Dec. 1, 2010

(65) Prior Publication Data

US 2011/0175718 A1    Jul. 21, 2011

(30) Foreign Application Priority Data

Jan. 21, 2010  (JP) ................................ 2010-011169

(51) Int. Cl.
*B60Q 1/22* (2006.01)
*B60Q 1/26* (2006.01)
(52) U.S. Cl. .................. 340/463; 340/425.5; 381/71.4
(58) Field of Classification Search .............. 340/463, 340/425.5; 381/71.4
See application file for complete search history.

(56) References Cited

U.S. PATENT DOCUMENTS

| 7,062,049 | B1 * | 6/2006 | Inoue et al. | 381/71.4 |
| 7,536,018 | B2 * | 5/2009 | Onishi et al. | 381/71.8 |
| 7,775,320 | B2 * | 8/2010 | McCain et al. | 181/206 |
| 2004/0240678 | A1 * | 12/2004 | Nakamura et al. | 381/71.11 |

FOREIGN PATENT DOCUMENTS

JP      5-208636      8/1993

* cited by examiner

*Primary Examiner* — Travis Hunnings
(74) *Attorney, Agent, or Firm* — Ditthavong Mori & Steiner, P.C.

(57) ABSTRACT

An active acoustic control apparatus includes an alert sound signal generator configured to generate an alert sound signal. An alert sound output device is configured to output an alert sound to an outside of a vehicle. A cancellation sound signal generator is configured to generate a cancellation sound signal representing a cancellation sound to cancel the alert sound, which has been transferred from the outside of the vehicle to an inside of the vehicle, at a sound cancellation target position inside the vehicle. A cancellation sound output device is configured to output the cancellation sound to the sound cancellation target position. The cancellation sound signal generator is configured to detect change of a transfer characteristic from the alert sound output device to the sound cancellation target position and to vary an output characteristic of the cancellation sound depending on the change of the transfer characteristic.

17 Claims, 9 Drawing Sheets

ACTIVE ACOUSTIC CONTROL APPARATUS

CROSS-REFERENCE TO RELATED APPLICATIONS

The present application claims priority under 35 U.S.C. §119 to Japanese Patent Application No. 2010-011169 filed Jan. 21, 2010, entitled "ACTIVE ACOUSTIC CONTROL APPARATUS." The contents of this application are incorporated herein by reference in their entirety.

BACKGROUND OF THE INVENTION

1. Field of the Invention

The present invention relates to an active acoustic control apparatus.

2. Description of the Related Art

Generally, a driving motor for an electric vehicle is quieter than an engine. Such a feature is advantageous in terms of noise, but it is inferior to the engine from the viewpoint of notifying the presence of the vehicle to pedestrians in the surroundings. Taking into account the above-described situation, an electric vehicle is developed which generates an alert sound from an external loudspeaker (i.e., a loudspeaker mounted as an external component to a vehicle body) while the vehicle is moving (see, for example, Japanese Unexamined Patent Application Publication No. 05-208636). In the electric vehicle disclosed in Japanese Unexamined Patent Application Publication No. 05-208636, the alert sound transferred to the inside of the vehicle is canceled by outputting, from an internal loudspeaker, a cancellation sound to cancel the alert sound, which is in opposite phase to that of the alert sound output from the external loudspeaker. The alert sound is generated in accordance with a reference signal that is in sync with rotation of a driving motor (see, for example, "Abstract" of Japanese Unexamined Patent Application Publication No. 05-208636). Further, when the cancellation sound is generated, adapted control is performed by using both the reference signal and an inverse transfer characteristic that is inverse to a transfer characteristic of an in-vehicle space transfer system (see, for example, "Abstract", paragraph [0021], and FIG. 3 of Japanese Unexamined Patent Application Publication No. 05-208636). The term "transfer characteristic of an in-vehicle space transfer system" used herein implies the transfer characteristic from the internal loudspeaker to a microphone (see, for example, paragraphs [0010], [0013], and [0022] and FIG. 3 of Japanese Unexamined Patent Application Publication No. 05-208636).

In the electric vehicle disclosed in Japanese Unexamined Patent Application Publication No. 05-208636, as described above, the alert sound is generated from the external loudspeaker in accordance with the reference signal that is in sync with the rotation of the driving motor, while the cancellation sound is output from the internal loudspeaker through the adapted control using both the reference signal and the inverse transfer characteristic that is inverse to the transfer characteristic of the in-vehicle space transfer system. Thus, the cancellation sound reflects the rotation of the driving motor and the transfer characteristic of the in-vehicle space transfer system. In other words, Japanese Unexamined Patent Application Publication No. 05-208636 does not take into account a transfer characteristic from the external loudspeaker to the microphone.

Depending on, for example, whether a vehicle window is opened or closed, however, the transfer characteristic from the external loudspeaker to the microphone is changed, thus causing a risk that an effect of canceling a sound, which is to be controlled, by the cancellation sound cannot be sufficiently developed unless the transfer characteristic from the external loudspeaker to the microphone is also taken into consideration.

SUMMARY OF THE INVENTION

According to one aspect of the present invention, an active acoustic control apparatus includes an alert sound signal generator, an alert sound output device, a cancellation sound signal generator, and a cancellation sound output device. The alert sound signal generator is configured to generate an alert sound signal representing an alert sound, which calls attention of a pedestrian. The alert sound output device is configured to output the alert sound to an outside of a vehicle in accordance with the alert sound signal. The cancellation sound signal generator is configured to generate a cancellation sound signal representing a cancellation sound to cancel the alert sound, which has been transferred from the outside of the vehicle to an inside of the vehicle, at a sound cancellation target position inside the vehicle. The cancellation sound output device is configured to output the cancellation sound to the sound cancellation target position in accordance with the cancellation sound signal. The cancellation sound signal generator is configured to detect change of a transfer characteristic from the alert sound output device to the sound cancellation target position. The cancellation sound signal generator is configured to vary an output characteristic of the cancellation sound depending on the change of the transfer characteristic.

According to another aspect of the present invention, an active acoustic control apparatus includes an alert sound signal generator, an alert sound output device, a cancellation sound signal generator, a cancellation sound output device, a detector, and a controller. The alert sound signal generator is configured to generate an alert sound signal representing an alert sound to call attention of a pedestrian. The alert sound output device is configured to output the alert sound to an outside of a vehicle in accordance with the alert sound signal. The cancellation sound signal generator is configured to generate a cancellation sound signal representing a cancellation sound to cancel, at a sound cancellation target position inside the vehicle, a transferred alert sound transferred from the outside of the vehicle to an inside of the vehicle. The cancellation sound output device is configured to output the cancellation sound to the sound cancellation target position in accordance with the cancellation sound signal. The detector is configured to detect change in a transfer characteristic from the alert sound output device to the sound cancellation target position. The controller is configured to control an output characteristic of the cancellation sound depending on the change in the transfer characteristic.

According to further aspect of the present invention, an active acoustic control apparatus includes alert sound signal generation means, alert sound output means, cancellation sound signal generation means, cancellation sound output means, detection means, and control means. The alert sound signal generation means is configured to generate an alert sound signal representing an alert sound to call attention of a pedestrian. The alert sound output means is configured to output the alert sound to an outside of a vehicle in accordance with the alert sound signal. The cancellation sound signal generation means is configured to generate a cancellation sound signal representing a cancellation sound to cancel, at a sound cancellation target position inside the vehicle, a transferred alert sound transferred from the outside of the vehicle to an inside of the vehicle. The cancellation sound output means is configured to output the cancellation sound to the sound cancellation target position in accordance with the cancellation sound signal. The detection means is configured to detect change in a transfer characteristic from the alert sound output device to the sound cancellation target position. The control means is configured to control an output characteristic of the cancellation sound depending on the change in the transfer characteristic.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

A. First Embodiment

1. Configurations of Entirety and Components (1) Entire Configuration

Figure 1:
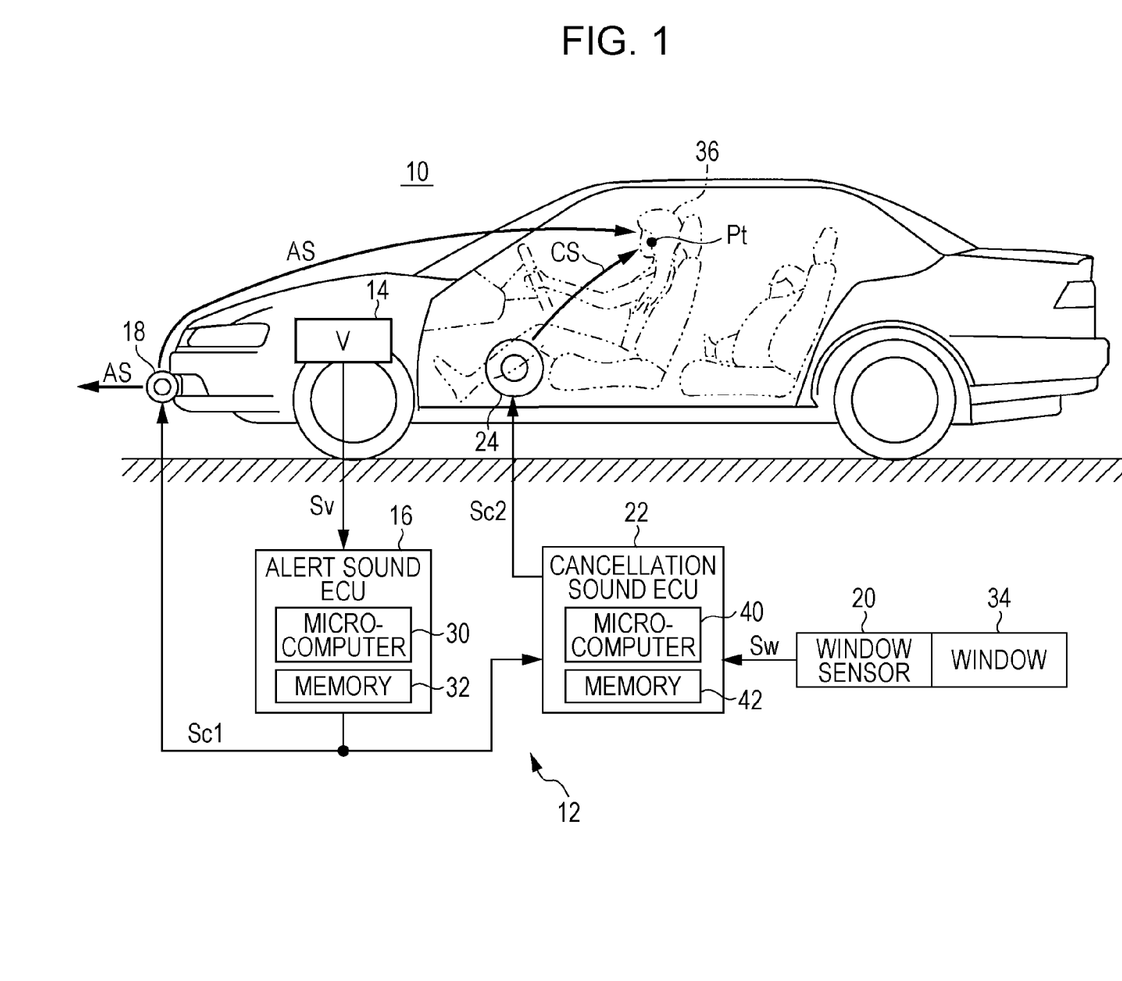
FIG. 1 is a schematic view illustrating the configuration of a vehicle equipped with an active acoustic control apparatus according to a first embodiment of the present invention.

FIG. 1 is a schematic view illustrating the configuration of a vehicle 10 equipped with an active acoustic control apparatus 12 (hereinafter referred to also as a "control device 12") according to a first embodiment of the present invention. The vehicle 10 can be an electric vehicle (including a hybrid car, a fuel cell car, etc.).

The control device 12 includes a vehicle speed sensor 14, an exterior alert-sound control unit 16 (hereinafter referred to as an "alert sound ECU 16"), an external loudspeaker 18, a window sensor 20, a cancellation sound control unit 22 (hereinafter referred to as a "cancellation sound ECU 22"), and an internal loudspeaker 24.

In the control device 12, the alert sound ECU 16 determines the necessity to output an alert sound AS based on a vehicle speed signal Sv from a vehicle speed sensor 14. When the alert sound ECU 16 determines that the output of the alert sound AS is required, it outputs a first control signal Sc1 to the external loudspeaker 18, thus causing the external loudspeaker 18 to output the alert sound AS. The alert sound AS serves to call attention of pedestrians around the vehicle (namely, the alert sound AS notifies the presence of the vehicle 10 to the pedestrians).

Further, in the control device 12, the cancellation sound ECU 22 determines the necessity to output a cancellation sound CS based on both the first control signal Sc1 from the alert sound ECU 16 and a window signal Sw from the window sensor 20. When the cancellation sound ECU 22 determines that the output of the cancellation sound CS is required, it outputs a second control signal Sc2 to the internal loudspeaker 24, thus causing the internal loudspeaker 24 to output the cancellation sound CS. The cancellation sound CS cancels the alert sound AS at a sound cancellation target position Pt inside the vehicle 10 (e.g., a position set near the ears of a passenger (occupant) 26 in this embodiment).

Be it noted that the cancellation sound ECU 22 can be given with the function of canceling engine booming noise and/or road noise in addition to the function of canceling the alert sound AS. Stated another way, the cancellation sound ECU 22 can also be configured to include the related-art function of canceling the engine booming noise (see, for example, Japanese Unexamined Patent Application Publication No. 2004-361721) and/or the related-art function of canceling the road noise (see, for example, Japanese Unexamined Patent Application Publication No. 05-265471).

While the window sensor 20 and the internal loudspeaker 24 are each illustrated only one in FIG. 1 and FIG. 2, which is described later, for easier understanding of the embodiment of the present invention, the window sensor 20 and the internal loudspeaker 24 may be each disposed plural depending on the usage of the cancellation sound ECU 22. In such a case, the numbers of the other components are also changed correspondingly as appropriate.

(2) Vehicle Speed Sensor 14

The vehicle speed sensor 14 detects a vehicle speed V [km/h] of the vehicle 10 and outputs the vehicle speed signal Sv representing the vehicle speed V to the alert sound ECU 16.

(3) Alert Sound ECU 16

The alert sound ECU 16 controls the output of the alert sound AS, which is output to the outside of the vehicle 10 from the external loudspeaker 18, in accordance with the vehicle speed signal Sv from the vehicle speed sensor 14. The alert sound ECU 16 includes a microcomputer 30 and a memory 32. The microcomputer 30 determines the necessity to output the alert sound AS and controls the output of the alert sound AS by using the first control signal Sc1. In other words, the microcomputer 30 can execute the function such as deciding the alert sound AS (i.e., the alert sound decision function) through software processing. The memory 32 stores programs and data (including data for the alert sound AS), which are used in the microcomputer 30.

The alert sound AS serves, as described above, to call attention of pedestrians around the vehicle 10 (namely, the alert sound AS notifies the presence of the vehicle 10 to the pedestrians), and the alert sound AS is output under a predetermined condition (when the vehicle 10 is moving at a predetermined speed (e.g., 20 km/h) or below in this embodiment). The alert sound AS can be generated as not only a sound in sync with the rotational frequency of the driving motor as disclosed in Japanese Unexamined Patent Application Publication No. 05-208636, but also as one of chimes, a melody, a single tone, a chord sound, and a sound causing the pedestrians to recall a running state of the vehicle 10, which are independent of the rotational frequency of the driving motor.

In this embodiment, the first control signal Sc1 is a digital signal that is digital-to-analog converted by a digital/analog converter (not shown). A resulting analog signal is amplified by an amplifier (not shown) and is then input to the external loudspeaker 18.

(4) External Loudspeaker 18

The external loudspeaker 18 outputs the alert sound AS corresponding to the first control signal Sc1, which is input from the alert sound ECU 16 (specifically, the microcomputer 30), to the outside of the vehicle 10. The output alert sound AS calls attention of the pedestrians around the vehicle 10.

(5) Window Sensor 20

The window sensor 20 detects the opened/closed state of a window 34 and outputs a window signal Sw representing the opened/closed state of the window 34 to the cancellation sound ECU 22.

(6) Cancellation Sound ECU 22

(a) Entire Configuration

The cancellation sound ECU 22 controls the output of the cancellation sound CS from the internal loudspeaker 24, and it includes a microcomputer 40, a memory 42 (FIG. 1), etc. The microcomputer 40 determines the necessity to output the cancellation sound CS and controls the output of the cancellation sound CS by using the second control signal Sc2. In other words, the microcomputer 40 can execute the function such as deciding the cancellation sound CS (i.e., the cancellation sound decision function) through software processing. The memory 42 stores programs and data, which are used in the microcomputer 40.

More specifically, the cancellation sound ECU 22 generates the second control signal Sc2 in accordance with both the first control signal Sc1 from the alert sound ECU 16 and the window signal Sw from the window sensor 20. Further, the cancellation sound ECU 22 controls the cancellation sound CS, which is output from the internal loudspeaker 24, by using the second control signal Sc2.

As described above, the cancellation sound CS cancels the alert sound AS, which has been transferred to the inside of the vehicle 10, at the sound cancellation target position Pt (e.g., the position set near the ears of the passenger 26 in this embodiment), thereby providing the sound canceling effect.

In this embodiment, the second control signal Sc2 is a digital signal that is digital-to-analog converted by a digital/analog converter (not shown). A resulting analog signal is amplified by an amplifier (not shown) and is then input to the internal loudspeaker 24.

Figure 2:
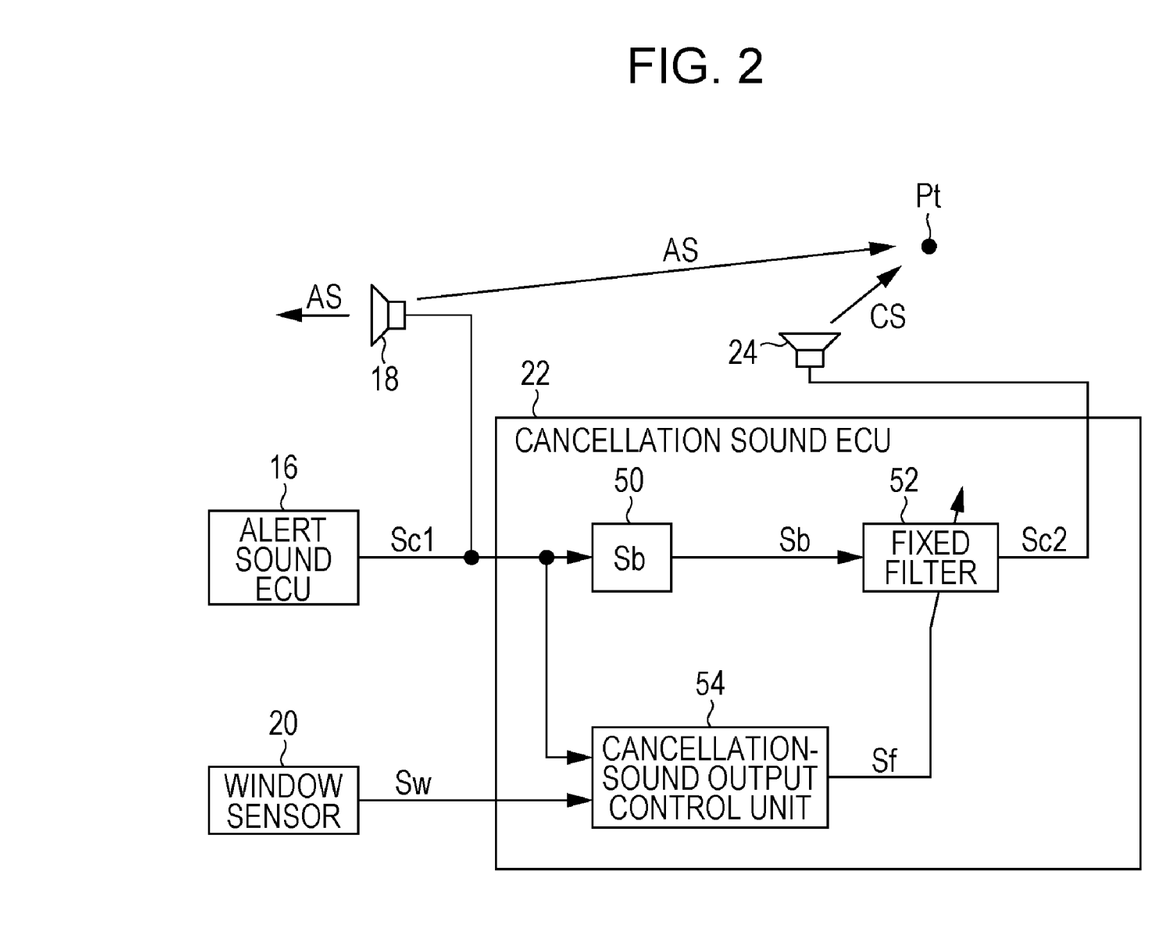
FIG. 2 is a schematic view illustrating the configuration of a cancellation sound ECU in the first embodiment.

FIG. 2 is a schematic view illustrating the configuration of the cancellation sound ECU 22. As illustrated in FIG. 2, the cancellation sound ECU 22 includes a reference signal generation unit 50, a fixed filter 52, and a cancellation-sound output control unit 54 (hereinafter referred to also as a "control unit 54"). The reference signal generation unit 50, the fixed filter 52, and the control unit 54 are constituted by the microcomputer 40 and the memory 42.

In FIG. 2, various components of the microcomputer 40 are drawn in the simplified form. In practice, some of the components may be provided plural for the reason that the reference signal Sb, for example, is actually generated in the state divided into a cosine wave and a sine wave (see, e.g., Japanese Unexamined Patent Application Publication No. 2004-361721).

(b) Reference Signal Generation Unit 50

The reference signal generation unit 50 generates the reference signal Sb, which is in the state divided into a cosine wave and a sine wave, in accordance with the first control signal Sc1 from the alert sound ECU 16 and outputs the reference signal Sb to the fixed filter 52 (as illustrated in the simplified form in FIG. 2). The reference signal generation unit 50 can be constituted, for example, by using a generation unit disclosed in Japanese Unexamined Patent Application Publication No. 2004-361721.

(c) Fixed Filter 52

The fixed filter 52 performs a correction process using a transfer characteristic C1 from the external loudspeaker 18 to the sound cancellation target position Pt and outputs the second control signal Sc2 (as described in detail later).

(d) Cancellation-Sound Output Control Unit 54

The cancellation-sound output control unit 54 selectively changes a filter coefficient Tf, which is used in the fixed filter 52, based on both the first control signal Sc1 from the alert sound ECU 16 and the window signal Sw from the window sensor 20. In other words, the control unit 54 selectively changes the filter coefficient Tf based on both the output state of the alert sound AS and the opened/closed state of the window 34 (as described in detail later).

(7) Internal Loudspeaker 24

The internal loudspeaker 24 outputs the cancellation sound CS corresponding to the second control signal Sc2, which is input from the cancellation sound ECU 22 (specifically, the microcomputer 40), to the inside of the vehicle 10 (in particular, to the sound cancellation target position Pt). As a result, the effect of canceling the alert sound AS is obtained.

2. Control of Various Units (1) Generation of Alert Sound AS

Figure 3:
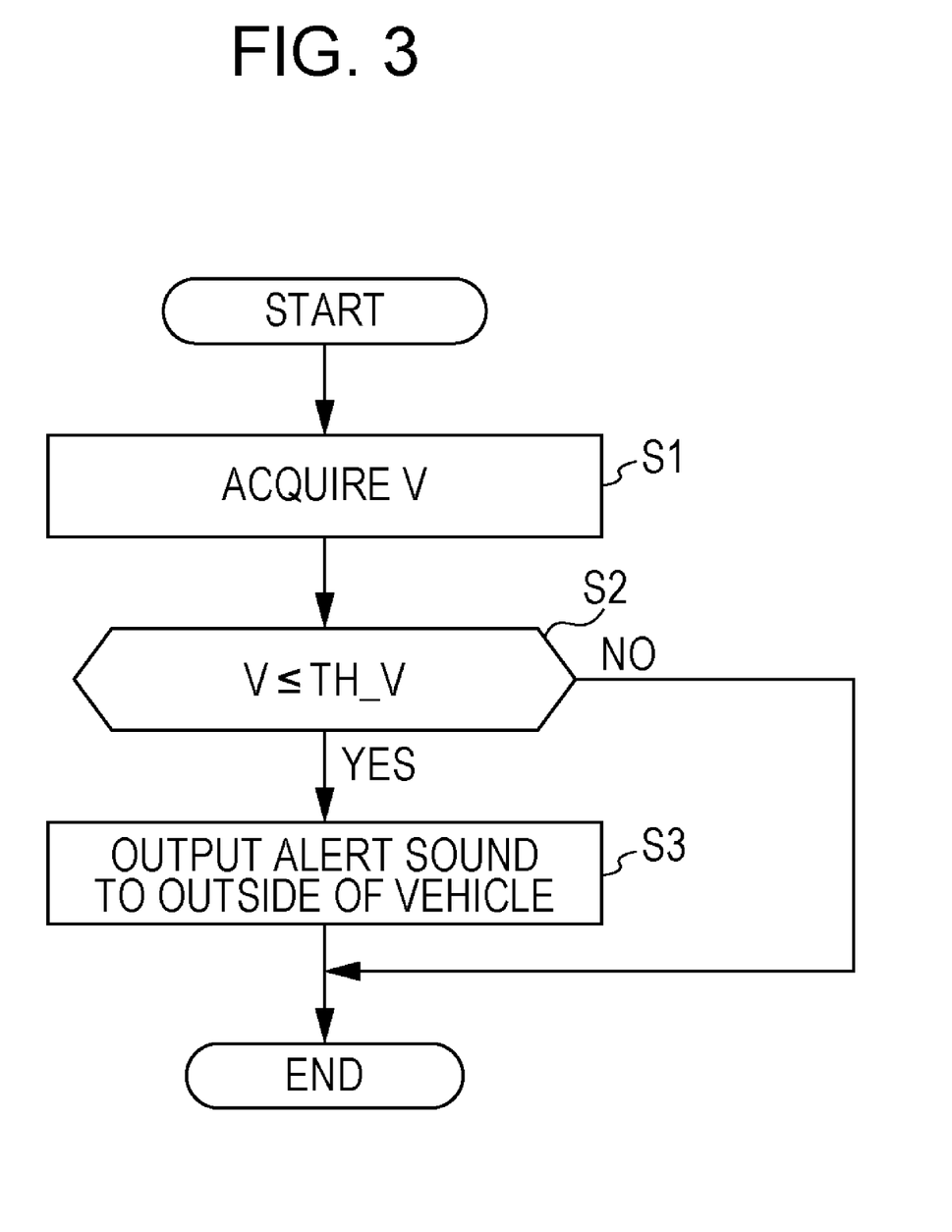
FIG. 3 is a flowchart for determining the necessity to output an alert sound in an alert sound ECU in the first embodiment.

The output of the alert sound AS in this embodiment will be described below. FIG. 3 is a flowchart for determining the necessity to output the alert sound AS in the alert sound ECU 16.

In step S1, the alert sound ECU 16 receives the vehicle speed signal Sv from the vehicle speed sensor 14 to acquire the vehicle speed V. In step S2, the alert sound ECU 16 determines whether the vehicle speed V is not larger than an exterior alert-sound output determination threshold TH_V (hereinafter referred to as a "threshold TH_V") [km/h]. The threshold TH_V is a threshold used for determining the necessity to output the alert sound AS and is stored in the memory 32. The threshold TH_V is, e.g., 20 km/h.

If the vehicle speed V is not larger than the threshold TH_V (S2: YES), the alert sound ECU 16 outputs, in step S3, the first control signal Sc1 to the external loudspeaker 18, thus causing the external loudspeaker 18 to output the alert sound AS. The first control signal Sc1 is output to not only the external loudspeaker 18, but also to the cancellation sound ECU 22. On the other hand, if the vehicle speed V exceeds the threshold TH_V (S2: NO), the current cycle of processing is brought to an end without outputting the alert sound AS.

The alert sound ECU 16 repeats the process of FIG. 3 while an ignition switch (not shown) of the vehicle 10 is kept turned on.

(2) Generation of Cancellation Sound CS

Figure 4:
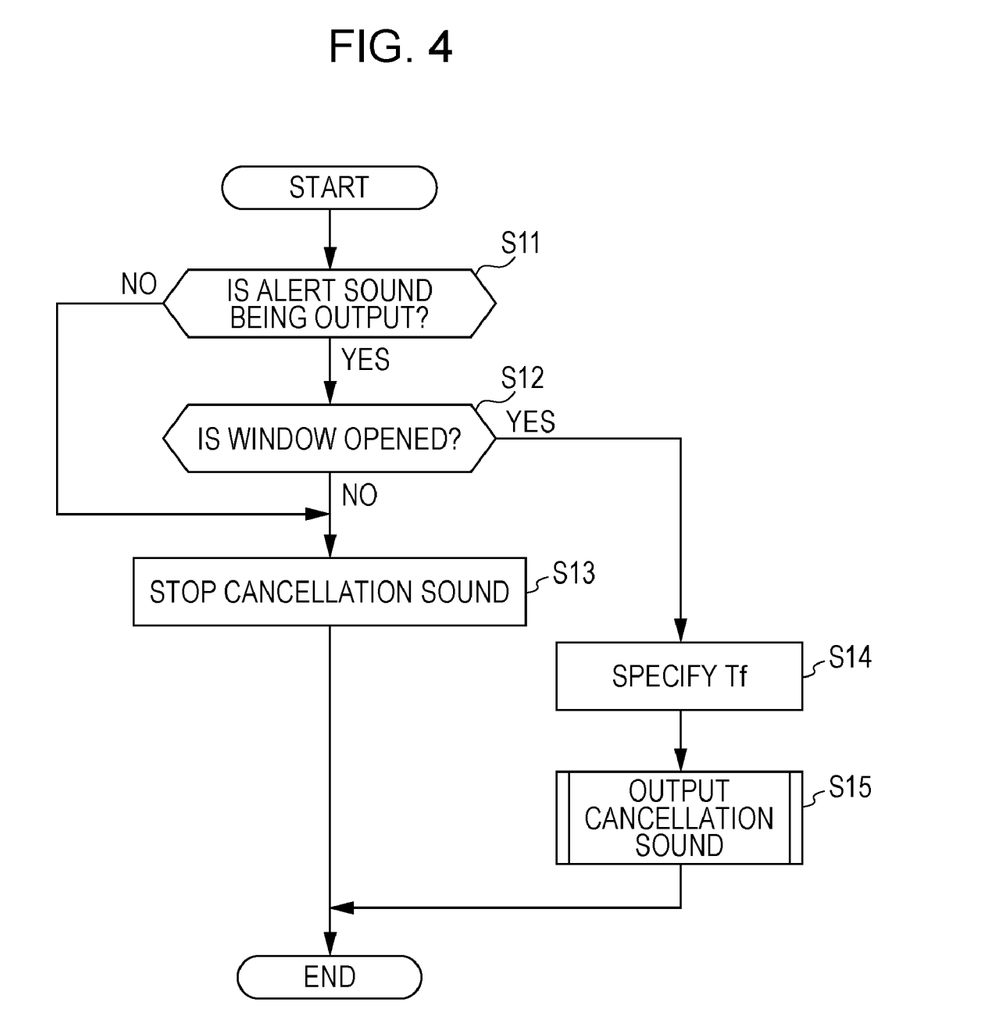
FIG. 4 is a flowchart for controlling output of the cancellation sound in the cancellation sound ECU in the first embodiment.

The output of the cancellation sound CS in the first embodiment will be described below. FIG. 4 is a flowchart for controlling the output of the cancellation sound CS in the cancellation sound ECU 22.

In step S11, the cancellation-sound output control unit 54 in the cancellation sound ECU 22 determines, based on the first control signal Sc1 from the alert sound ECU 16, whether the alert sound AS is being output. If the alert sound AS is not being output (S11: NO), the process advances to step S13. If the alert sound AS is being output (S11: YES), the control unit 54 determines in step S12, based on the window signal Sw from the window sensor 20, whether the window 34 is opened (whether any window is opened when there are plural widows 34 as determination targets).

If it is determined in step S12 that the window 34 is not opened (S12: NO) or if it is determined in step S11 that the alert sound AS is not being output (S11: NO), the control unit 54 stops, in step S13, the output of the second control signal Sc2, thereby stopping the output of the cancellation sound CS. The output of the second control signal Sc2 is stopped by setting the filter coefficient Tf of the fixed filter 52 to zero with a filter coefficient signal Sf that is transmitted from the control unit 54 to the fixed filter 52.

If the window 34 is opened (S12: YES), the control unit 54 specifies the filter coefficient Tf used in the current cycle of processing and selectively changes the filter coefficient Tf, which is to be used in the fixed filter 52, in step S14 by employing the filter coefficient signal Sf. In the first embodiment, the filter coefficient Tf is selectively changed corresponding to an opening degree D of the window 34.

More specifically, the filter coefficient Tf corresponding to the opening degree D is previously stored in the memory 42 of the cancellation sound ECU 22. The opening degree D can be set in a manner of dividing, e.g., a vertical opening, which is formed when the window 34 is opened, into predetermined ranges of size (vertical width). For example, the opening degree D can be divided into a range where the opening size exceeds 0 cm and is smaller than 1 cm, a range where the opening size is not smaller than 1 cm and is smaller than 3 cm, and a range where the opening size is not smaller than 3 cm and is up to a maximum value in the fully opened state.

The filter coefficient Tf corresponding to the opening degree D primarily depends on the transfer characteristic C1 from the external loudspeaker 18 to the sound cancellation target position Pt. In other words, the transfer characteristic C1 is the transfer characteristic from the external loudspeaker 18 to the sound cancellation target position Pt, and the transfer characteristic C2 is the transfer characteristic from the internal loudspeaker 24 to the sound cancellation target position Pt.

Because the alert sound AS output from the external loudspeaker 18 reaches the sound cancellation target position Pt in accordance with the transfer characteristic C1, it is expressed as a function of "Sc1×C1" at the sound cancellation target position Pt. Also, because the cancellation sound CS output from the internal loudspeaker 24 reaches the sound cancellation target position Pt in accordance with the transfer characteristic C2 from the internal loudspeaker 24 to the sound cancellation target position Pt, it is expressed as a function of "Sc1×C2" at the sound cancellation target position Pt on condition the filter coefficient Tf is not taken into account. Therefore, when the filter coefficient Tf is given by "−C1/C2", the cancellation sound CS at the sound cancellation target position Pt is expressed by a function of "−Sc1×C1" {=Sc1×C2×(−C1/C2)}. Thus, the cancellation sound CS is in opposite phase to that of the alert sound AS and is able to cancel the alert sound AS. The filter coefficient Tf can be set, for example, based on experiments or simulations.

Because the transfer characteristic C2 from the internal loudspeaker 24 to the sound cancellation target position Pt is also affected by the opening degree D of the window 34, it is preferable that change of the transfer characteristic C2 is further taken into consideration to be reflected on the filter coefficient Tf when the filter coefficient Tf is set.

When the window sensor 20 is disposed for each of plural windows 34, the filter coefficient Tf can be selectively changed corresponding to the opening degree D of each window 34. For example, the filter coefficient Tf can be selectively changed depending on the case where the front left, front right and rear right windows 34 are fully closed and the rear left window 34 is opened, the case where the front left and front right windows 34 are fully closed and the rear left and rear right windows 34 are opened, and the case where all the window 34 are opened.

Returning to FIG. 4, in next step S15, the cancellation sound ECU 22 causes the internal loudspeaker 24 to output the cancellation sound CS. More specifically, the control unit 54 starts control to output the second control signal Sc2 by using the filter coefficient Tf that is newly set in step S14. Further, the control unit 54 outputs the second control signal Sc2 in a manner illustrated in FIG. 5.

Figure 5:
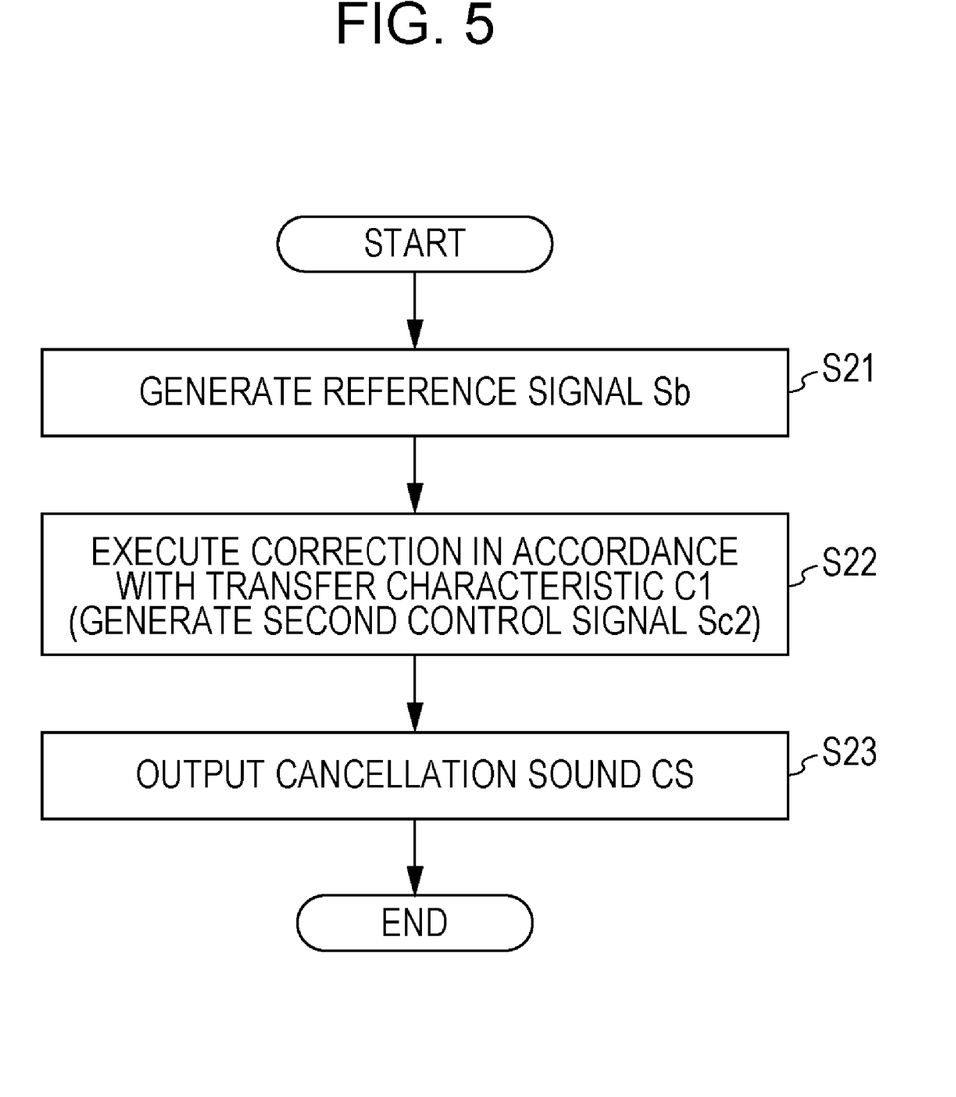
FIG. 5 is a flowchart for generating the cancellation sound in the first embodiment.

FIG. 5 is a flowchart for generating the cancellation sound CS. In step S21, the reference signal generation unit 50 generates the reference signal Sb in accordance with the first control signal Sc1 from the alert sound ECU 16.

In step S22, the fixed filter 52 generates the second control signal Sc2 by correcting the reference signal Sb, which is sent from the reference signal generation unit 50, based on the transfer characteristic C1 (i.e., by multiplying the reference signal by the filter coefficient Tf).

Be it noted that, in the first embodiment, the filter coefficient Tf used in the fixed filter 52 is given as per specified in step S14 of FIG. 4.

In step S23, the internal loudspeaker 24 outputs the cancellation sound CS in accordance with the second control signal Sc2. The second control signal Sc2 is digital-to-analog converted by the digital/analog converter (not shown). A resulting analog signal is amplified by the amplifier (not shown) at a predetermined amplification factor and is then input to the internal loudspeaker 24.

The cancellation sound ECU 22 repeats steps S21 to S23 while an on/off switch (not shown) for the cancellation sound ECU 22 is kept turned on.

3. Advantages of First Embodiment

With the first embodiment described above, the filter coefficient Tf of the fixed filter 52 is selectively changed depending on change of the transfer characteristic C1 from the external loudspeaker 18 to the sound cancellation target position Pt. Accordingly, even when the transfer characteristic C1 from the external loudspeaker 18 to the sound cancellation target position Pt is changed, the cancellation sound CS can be output depending on the change of the transfer characteristic C1.

With the first embodiment, the cancellation sound ECU 22 starts the generation of the cancellation sound CS in response to the change from the closed state to the opened state of the window 34 and stops the generation of the cancellation sound CS in response to the change from the opened state to the closed state of the window 34 (see FIG. 4). Therefore, the cancellation sound CS can be output when the alert sound AS generated to the outside of the vehicle 10 becomes more easily transferrable to the inside of the vehicle 10 upon the window 34 being opened from the state where the window 34 is closed and where the alert sound AS is mostly or entirely not transferred to the inside of the vehicle 10. As a result, when the window 34 is closed, the cancellation sound CS can be prevented from being increased unintentionally, and a computation load for the cancellation sound CS can be reduced.

With the first embodiment, the filter coefficient Tf of the fixed filter 52 is selectively changed depending on the opened/closed state of the window 34, and the same filter coefficient Tf is used when the opened/closed state of the window 34 is not changed. Since the filter coefficient Tf is determined depending on the opened/closed state of the window 34, other computation (e.g., computation necessary for adaptive control in the second embodiment described later) is not needed. Accordingly, a computation load for the filter coefficient Tf can be reduced.

B. Second Embodiment

1. Configurations of Entirety and Components (Differences from First Embodiment)

Figure 6:
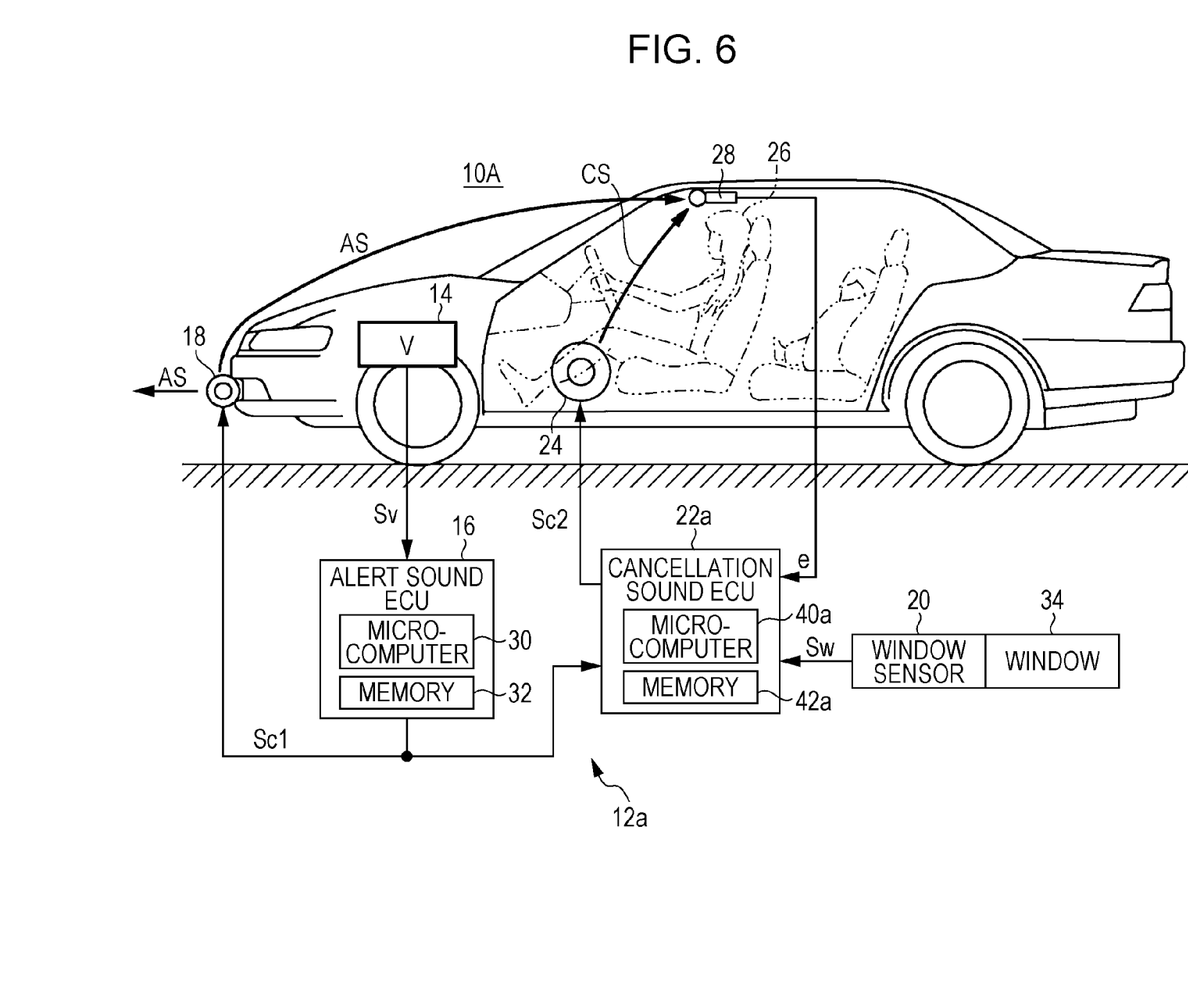
FIG. 6 is a schematic view illustrating the configuration of a vehicle equipped with an active acoustic control apparatus according to a second embodiment of the present invention.

FIG. 6 is a schematic view illustrating the configuration of a vehicle 10A equipped with an active acoustic control apparatus 12a (hereinafter referred to also as a "control device 12a") according to a second embodiment of the present invention. The vehicle 10A is basically similar to the vehicle 10 in the first embodiment, but it differs from the vehicle 10 in the following points. While the cancellation sound ECU 22 in the vehicle 10 generates the second control signal Sc2 by using the fixed filter 52, a cancellation sound control device 22a (hereinafter referred to as a "cancellation sound ECU 22a") in the vehicle 10A generates the second control signal Sc2 through the so-called adaptive control. Further, the second embodiment employs a microphone 28. The cancellation sound ECU 22a includes a microcomputer 40a and a memory 42a.

Figure 7:
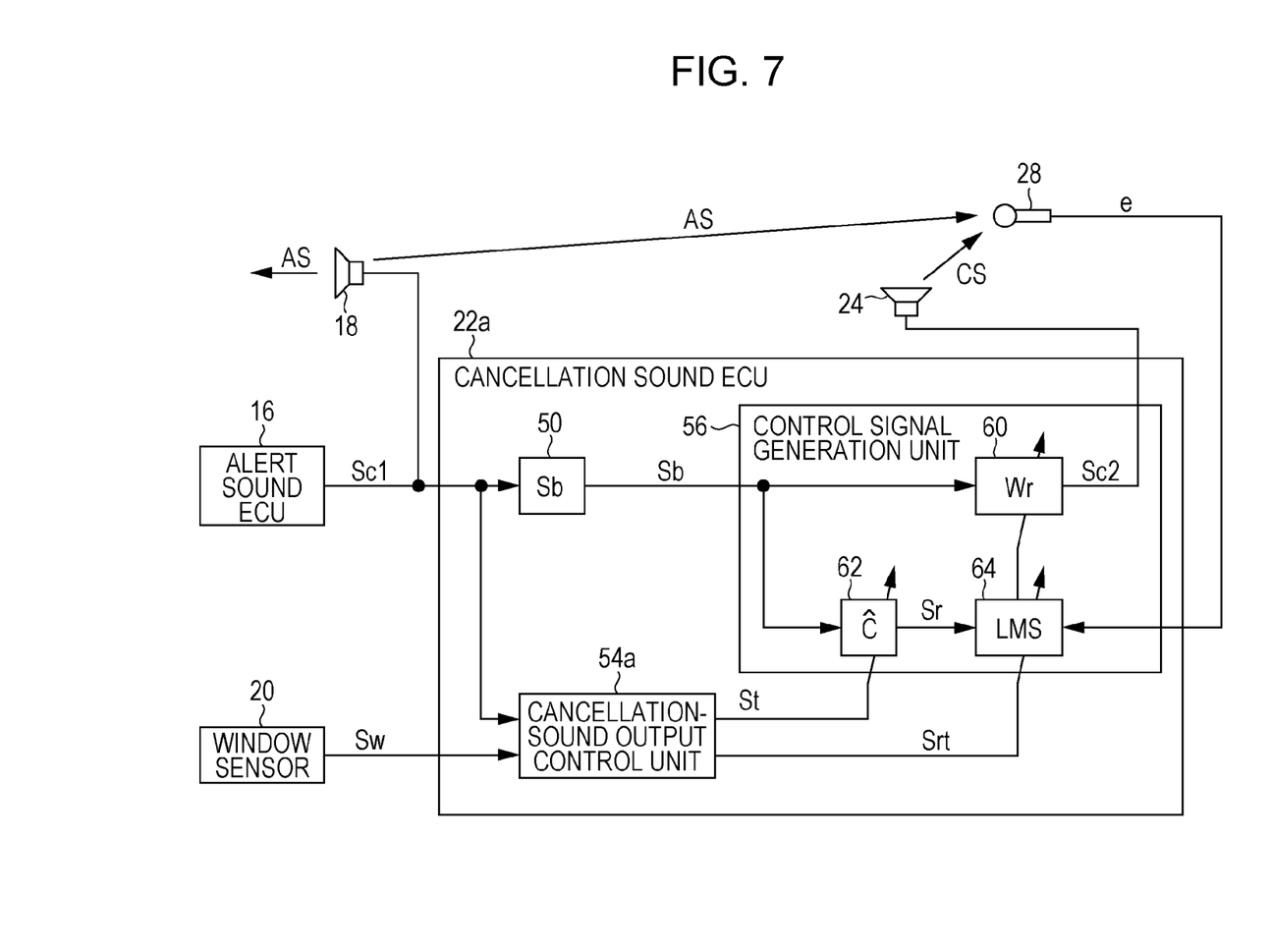
FIG. 7 is a schematic view illustrating the configuration of a cancellation sound ECU in the second embodiment.

FIG. 7 is a schematic view illustrating the configuration of the cancellation sound ECU 22a. As illustrated in FIG. 7, the cancellation sound ECU 22a includes a reference signal generation unit 50, a control signal generation unit 56, and a cancellation-sound output control unit 54a (hereinafter referred to also as a "control unit 54a"). The reference signal generation unit 50, the control signal generation unit 56, and the control unit 54a are constituted by the microcomputer 40a and the memory 42a.

In FIG. 7, as in FIG. 2 representing the first embodiment, various components of the microcomputer 40a are drawn in the simplified form. In practice, some of the components may be provided plural for the reason that the reference signal Sb, for example, is actually generated in the state divided into a cosine wave and a sine wave.

The reference signal generation unit 50 is the same as that in the first embodiment.

The control signal generation unit 56 executes an adaptive filtering process based on the reference signal Sb sent from the reference signal generation unit 50, thereby generating the second control signal Sc2. The control signal generation unit 56 includes an adaptive filter 60, a reference signal correction unit 62, and a filter coefficient update unit 64.

The adaptive filter 60 is a filter of, e.g., the FIR (Finite Impulse Response) type or the adaptive notch type. The adaptive filter 60 executes the adaptive filtering process on the reference signal Sb by using a filter coefficient Wr and outputs the second control signal Sc2 that represents the waveform of the cancellation sound CS to reduce the alert sound AS.

The reference signal correction unit 62 generates a correction reference signal Sr by executing a transfer function process on the reference signal Sb from the reference signal generation unit 50. The correction reference signal Sr is used when the filter coefficient Wr is calculated in the filter coefficient update unit 64. The transfer function process is a process of correcting the reference signal Sb based on a transfer function Ĉ. The transfer function Ĉ used in the transfer function process depends on a transfer characteristic C3 from the internal loudspeaker 24 to the microphone 28 (the transfer characteristic C3 being given as a measured value or a predicted value).

The filter coefficient update unit 64 sequentially computes and updates the filter coefficient Wr. The filter coefficient update unit 64 computes the filter coefficient Wr based on an adaptive algorithm (e.g., Least Mean Square (LMS) algorithm). More specifically, the filter coefficient update unit 64 computes the filter coefficient Wr based on both the correction reference signal Sr from the reference signal correction unit 62 and an error signal e from the microphone 28 so that the square $e^2$ of the error signal e becomes zero.

Be it noted that, in the second embodiment, the filter coefficient Wr computed by the filter coefficient update unit 64 is further controlled by the cancellation-sound output control unit 54a (as described in detail later).

The cancellation-sound output control unit 54a controls the reference signal correction unit 62 and the filter coefficient update unit 64 based on both the first control signal Sc1 from the alert sound ECU 16 and the window signal Sw from the window sensor 20 (as described in detail later).

2. Control of Various Components (1) Generation of Alert Sound AS

Output of the alert sound AS in the second embodiment is performed in a similar manner to that in the first embodiment. In other words, the alert sound ECU 16 generates the alert sound AS in accordance with the flow of FIG. 3.

(2) Generation of Cancellation Sound CS

Figure 8:
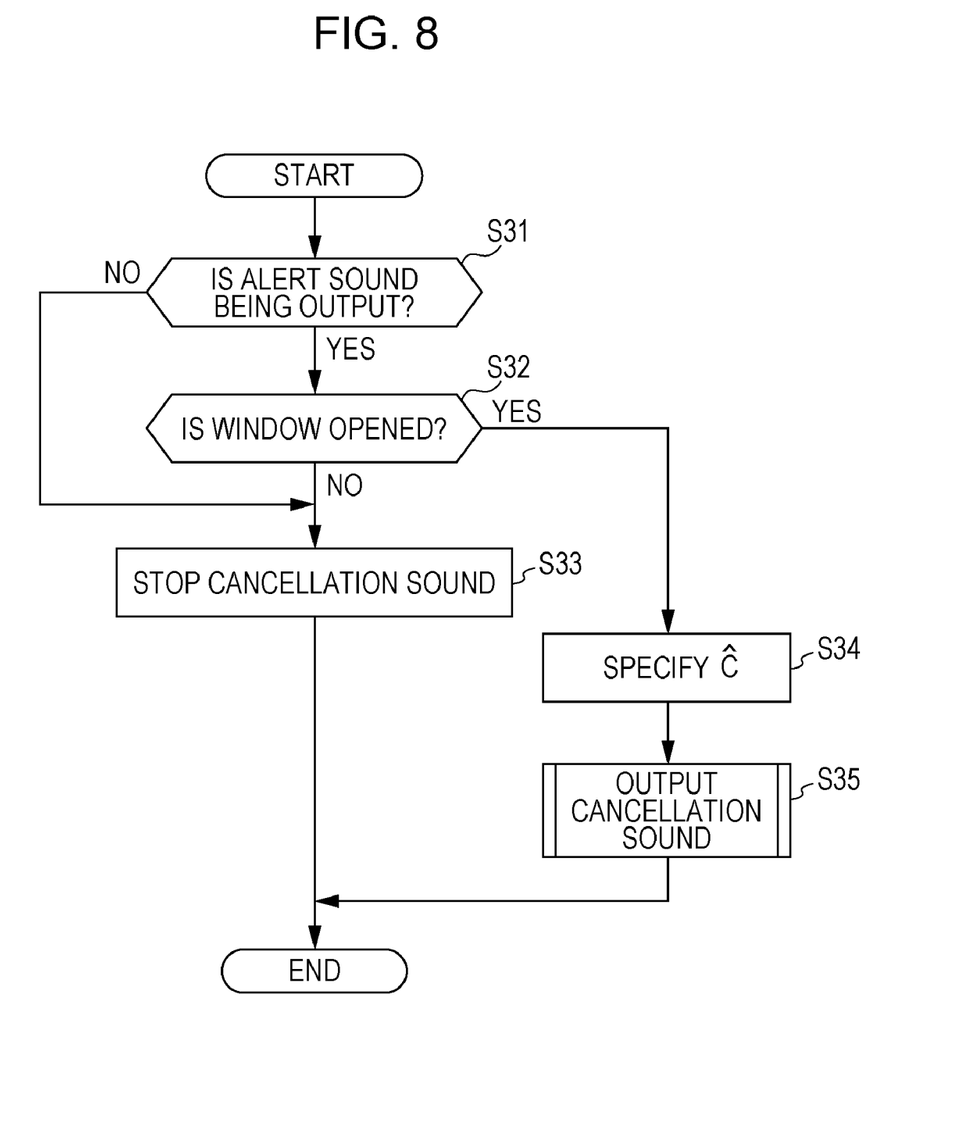
FIG. 8 is a flowchart for controlling output of a cancellation sound in the cancellation sound ECU in the second embodiment.

Output of the cancellation sound CS in the second embodiment will be described below. FIG. 8 is a flowchart for controlling the output of the cancellation sound CS in the cancellation sound ECU 22a.

In step S31, the cancellation-sound output control unit 54a in the cancellation sound ECU 22a determines, based on the first control signal Sc1 from the alert sound ECU 16, whether the alert sound AS is being output. If the alert sound AS is not being output (S31: NO), the process advances to step S33. If the alert sound AS is being output (S31: YES), the control unit 54a determines in step S32, based on the window signal Sw from the window sensor 20, whether the window 34 is opened (whether any window is opened when there are plural widows 34 as determination targets).

If it is determined in step S32 that the window 34 is not opened (S32: NO) or if it is determined in step S31 that the alert sound AS is not being output (S31: NO), the control unit 54a stops, in step S33, the output of the second control signal Sc2, thereby stopping the output of the cancellation sound CS. The output of the second control signal Sc2 is stopped by outputting a reset signal Srt to the filter coefficient update unit 64, thus setting the filter coefficient Wr to zero.

If the window 34 is opened (S32: YES), the control unit 54a specifies the transfer function Ĉ used in the current cycle of processing and selectively changes the transfer function Ĉ, which is to be used in the reference signal correction unit 62, in step S34 by employing a transfer function signal St.

In the second embodiment, the transfer function Ĉ is selectively changed corresponding to an opening degree D of the window 34. More specifically, the transfer function Ĉ corresponding to the opening degree D is previously stored in the memory 42a of the cancellation sound ECU 22a. The opening degree D can be set in a manner of dividing, e.g., a vertical opening, which is formed when the window 34 is opened, into predetermined ranges of size (vertical width). For example, the opening degree D can be divided into a range where the opening size exceeds 0 cm and is smaller than 1 cm, a range where the opening size is not smaller than 1 cm and is smaller than 3 cm, and a range where the opening size is not smaller than 3 cm and is up to a maximum value in the fully opened state.

The transfer function $\hat{C}$ corresponding to the opening degree D is selectively changed depending on change of the transfer characteristic C3 from the internal loudspeaker 24 to the sound cancellation target position (i.e., to the microphone 28 in the second embodiment).

More specifically, even when the positional relationship between the internal loudspeaker 24 and the microphone 28 is constant, the transfer characteristic C3 from the internal loudspeaker 24 to the microphone 28 is varied with change of the opening degree D of the window 34. In other words, when a transfer characteristic C4 from the external loudspeaker 18 to the microphone 28 is varied with change of the opening degree D of the window 34, the transfer characteristic C3 from the internal loudspeaker 24 to the microphone 28 is also changed at the same time. Taking such a point into consideration, in the second embodiment, the opening degree D of the window 34 and the transfer function $\hat{C}$ are stored in the memory 42a in a correspondence relation, and the transfer function $\hat{C}$ is selectively changed corresponding to the opening degree D. As a result, the transfer function $\hat{C}$ can more exactly reflect the transfer characteristic C3 from the internal loudspeaker 24 to the microphone 28, and hence the filter coefficient Wr of the adaptive filter 60 can be set to a more appropriate value. Be it noted that the transfer function $\hat{C}$ specified in step S34 is not to stop the output of the cancellation sound CS (namely, it is not to make the amplitude of the cancellation sound CS zero). The transfer function $\hat{C}$ can be set, for example, based on experiments or simulations.

When the window sensor 20 is disposed for each of plural windows 34, the transfer function $\hat{C}$ can be selectively changed corresponding to the opening degree D of each window 34. For example, the transfer function $\hat{C}$ can be selectively changed depending on the case where the front left, front right and rear right windows 34 are fully closed and the rear left window 34 is opened, the case where the front left and front right windows 34 are fully closed and the rear left and rear right windows 34 are opened, and the case where all the window 34 are opened.

Returning to FIG. 8, in next step S35, the cancellation sound ECU 22a causes the internal loudspeaker 24 to output the cancellation sound CS. More specifically, the control unit 54a stops the output of the reset signal Srt to the filter coefficient update unit 64 (namely, sets a level of the reset signal Srt to be low) and starts control to output the second control signal Sc2. Further, the control unit 54a outputs the second control signal Sc2 in a manner illustrated in FIG. 9.

Figure 9:
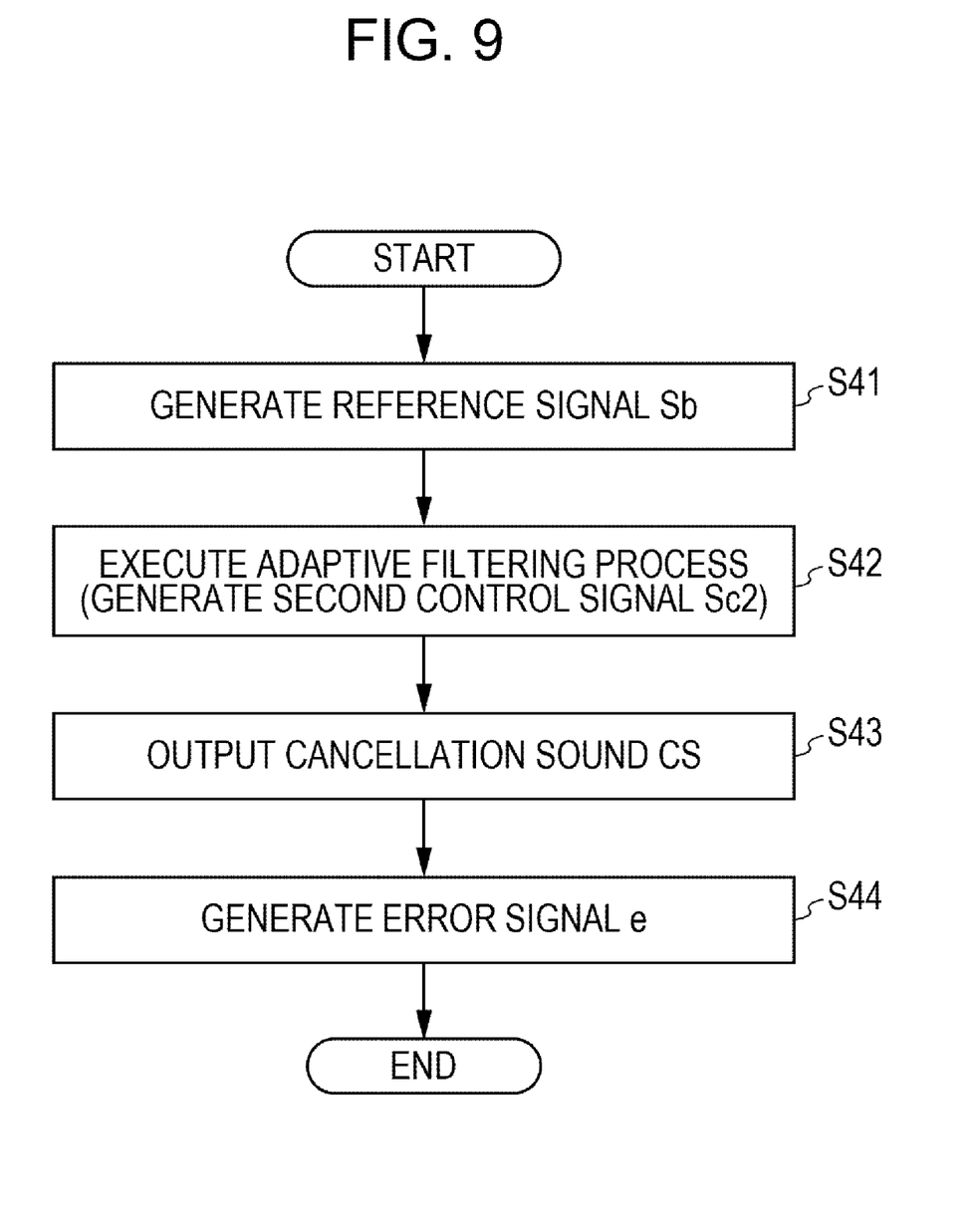
FIG. 9 is a flowchart for generating the cancellation sound in the second embodiment.

FIG. 9 is a flowchart for generating the cancellation sound CS. In step S41, the reference signal generation unit 50 generates the reference signal Sb in accordance with the first control signal Sc1 from the alert sound ECU 16.

In step S42, the control signal generation unit 56 executes the adaptive filtering process based on both the reference signal Sb from the reference signal generation unit 50 and the error signal e from the microphone 28, thereby generating the second control signal Sc2.

In the second embodiment, the transfer function $\hat{C}$ used in the reference signal correction unit 62 is given as per specified in step S34 of FIG. 8.

In step S43, the internal loudspeaker 24 outputs the cancellation sound CS in accordance with the second control signal Sc2. In next step S44, the microphone 28 detects, as residual noise, the difference between the alert sound AS and the cancellation sound CS and outputs the error signal e corresponding to the detected residual noise. The error signal e is used in the subsequent adaptive filtering process that is executed in the cancellation sound ECU 22a.

The cancellation sound ECU 22a repeats steps S41 to S44 while an on/off switch (not shown) for the cancellation sound ECU 22a is kept turned on.

3. Advantages of Second Embodiment

With the second embodiment described above, the following advantage can be obtained in addition to the advantages of the first embodiment. Because of employing the adaptive control in the second embodiment, even when the output characteristics of the external loudspeaker 18 and the internal loudspeaker 24 vary over time, the filter coefficient Wr can be computed in a way compensating for the variation over time.

C. Applications of Present Invention

As a matter of course, the present invention is not limited to the embodiments described above. For example, the following modifications are possible.

The cancellation sound ECU 22 in the first embodiment selectively changes the filter coefficient Tf depending on the opened/closed state of the window 34, and the cancellation sound ECU 22a in the second embodiment selectively changes the transfer function $\hat{C}$ depending on the opened/closed state of the window 34. However, a factor used for selectively changing the filter coefficient Tf or the transfer function $\hat{C}$ is not limited to the opened/closed state of the window 34. Such a factor may be, e.g., the opened/closed state of a roof (such as a sunroof or a roof of an open car).

In each of the embodiments described above, the generation of the cancellation sound CS is started in response to the change from the closed state to the opened state of the window 34, and the generation of the cancellation sound CS is stopped in response to the change from the opened state to the closed state of the window 34 (see FIGS. 4 and 8). However, a manner of generating the cancellation sound CS is not limited to the above-described one, and the cancellation sound CS may be output regardless of the opened/closed state of the window 34. For example, the first embodiment may be modified such that the filter coefficient Tf of the fixed filter 52, which is used when the window 34 is closed, is not set to zero and different filter coefficients Tf are selectively used between when the window 34 is closed and when the window 34 is opened.

In each of the embodiments described above, the alert sound AS is generated as a sound independent of the rotational frequency of the driving motor (no shown) in the vehicle 10, and the second control signal Sc2 is generated by the cancellation sound ECU 22 or 22a in accordance with the first control signal Sc1. However, the present invention is not limited to the above-described embodiments, and the alert sound AS may be generated as a sound in sync with the rotational frequency of the driving motor, and the second control signal Sc2 may be generated by the cancellation sound ECU 22 or 22a in accordance with the first control signal Sc1 that is in sync with the rotational frequency of the driving motor.

In the first embodiment, when the cancellation sound CS is not output, the cancellation-sound output control unit 54 stops the output of the second control signal Sc2 by setting the filter coefficient Tf of the fixed filter 52 to zero. Similarly, in the second embodiment, when the cancellation sound CS is not output, the cancellation-sound output control unit 54a stops the output of the second control signal Sc2 by outputting the reset signal Srt to the filter coefficient update unit 64 and by setting the filter coefficient Wr to zero. However, a manner of stopping the output of the cancellation sound CS is not limited to the above-described ones. Because the cancellation sound ECU 22 or 22a generates the second control signal Sc2 through the software processing as described above, the cancellation sound ECU 22 or 22a may, for example, simply stop the computation of the second control signal Sc2 when the cancellation sound CS is not to be output.

According to the embodiment of the present invention, the output characteristic of the cancellation sound is varied depending on the change of the transfer characteristic from the alert sound output device as an external component of the vehicle to the sound cancellation target position inside the vehicle. Accordingly, even when the transfer characteristic from the alert sound output device as the external component of the vehicle to the sound cancellation target position inside the vehicle is changed, the cancellation sound can be output depending on the change of the transfer characteristic.

The cancellation sound signal generator may detect the change of the transfer characteristic corresponding to an opened/closed state of at least one window or roof of the vehicle.

The cancellation sound signal generator may start the generation of the cancellation sound in response to change from the closed state to the opened state of the window or the roof, and may stop the generation of the cancellation sound in response to change from the opened state to the closed state of the window or the roof. With such a feature, the cancellation sound can be output when the alert sound generated to the outside of the vehicle becomes more easily transferrable to the inside of the vehicle upon the window or the roof being opened from the state where the window or the roof is closed and where the alert sound is mostly or entirely not transferred to the inside of the vehicle. As a result, when the window or the roof is closed, the cancellation sound can be prevented from being increased unintentionally, and a computation load for the cancellation sound can be reduced.

The cancellation sound signal generator may include a fixed filter having a predetermined filter coefficient and may selectively change the filter coefficient depending on the opened/closed state of the window or the roof. With such a feature, since the filter coefficient is determined depending on the opened/closed state of the window or the roof, computation necessary for other control is not needed. Accordingly, a computation load for the filter coefficient can be reduced.

The alert sound may be a sound independent of a rotational frequency of a driving motor for the vehicle, and the cancellation sound signal generator may generate the cancellation sound signal in accordance with the alert sound signal.

The alert sound may be one of chimes, a melody, a single tone, a chord sound, and a sound causing the pedestrian to recall a running state of the vehicle.

Obviously, numerous modifications and variations of the present invention are possible in light of the above teachings. It is therefore to be understood that within the scope of the appended claims, the invention may be practiced otherwise than as specifically described herein.

What is claimed is:

1. An active acoustic control apparatus comprising:
    an alert sound signal generator configured to generate an alert sound signal representing an alert sound, which calls attention of a pedestrian;
    an alert sound output device configured to output the alert sound to an outside of a vehicle in accordance with the alert sound signal;
    a cancellation sound signal generator configured to generate a cancellation sound signal representing a cancellation sound to cancel the alert sound, which has been transferred from the outside of the vehicle to an inside of the vehicle, at a sound cancellation target position inside the vehicle; and
    a cancellation sound output device configured to output the cancellation sound to the sound cancellation target position in accordance with the cancellation sound signal,
    wherein the cancellation sound signal generator is configured to detect change of a transfer characteristic from the alert sound output device to the sound cancellation target position and to vary an output characteristic of the cancellation sound depending on the change of the transfer characteristic.

2. The active acoustic control apparatus according to claim 1, wherein the cancellation sound signal generator is configured to detect the change of the transfer characteristic corresponding to an opened/closed state of at least one window or roof of the vehicle.

3. The active acoustic control apparatus according to claim 2, wherein the cancellation sound signal generator starts the generation of the cancellation sound in response to change from the closed state to the opened state of the window or the roof, and stops the generation of the cancellation sound in response to change from the opened state to the closed state of the window or the roof.

4. The active acoustic control apparatus according to claim 2, wherein the cancellation sound signal generator includes a fixed filter having a predetermined filter coefficient and selectively changes the filter coefficient depending on the opened/closed state of the window or the roof.

5. The active acoustic control apparatus according to claim 1,
    wherein the alert sound is a sound independent of a rotational frequency of a driving motor for the vehicle, and
    wherein the cancellation sound signal generator is configured to generate the cancellation sound signal in accordance with the alert sound signal.

6. The active acoustic control apparatus according to claim 5, wherein the alert sound comprises at least one of chimes, a melody, a single tone, a chord sound, and a sound causing the pedestrian to recall a running state of the vehicle.

7. An active acoustic control apparatus comprising:
    an alert sound signal generator configured to generate an alert sound signal representing an alert sound to call attention of a pedestrian;
    an alert sound output device configured to output the alert sound to an outside of a vehicle in accordance with the alert sound signal;
    a cancellation sound signal generator configured to generate a cancellation sound signal representing a cancellation sound to cancel, at a sound cancellation target position inside the vehicle, a transferred alert sound transferred from the outside of the vehicle to an inside of the vehicle;
    a cancellation sound output device configured to output the cancellation sound to the sound cancellation target position in accordance with the cancellation sound signal;
    a detector configured to detect change in a transfer characteristic from the alert sound output device to the sound cancellation target position; and
    a controller configured to control an output characteristic of the cancellation sound depending on the change in the transfer characteristic.

8. An active acoustic control apparatus comprising:

alert sound signal generation means for generating an alert sound signal representing an alert sound to call attention of a pedestrian;

alert sound output means for outputting the alert sound to an outside of a vehicle in accordance with the alert sound signal;

cancellation sound signal generation means for generating a cancellation sound signal representing a cancellation sound to cancel, at a sound cancellation target position inside the vehicle, a transferred alert sound transferred from the outside of the vehicle to an inside of the vehicle;

cancellation sound output means for outputting the cancellation sound to the sound cancellation target position in accordance with the cancellation sound signal;

detection means for detecting change in a transfer characteristic from the alert sound output device to the sound cancellation target position; and control means for controlling an output characteristic of the cancellation sound depending on the change in the transfer characteristic.

9. The active acoustic control apparatus according to claim 3, wherein the cancellation sound signal generator includes a fixed filter having a predetermined filter coefficient and selectively changes the filter coefficient depending on the opened/closed state of the window or the roof.

10. The active acoustic control apparatus according to claim 2, wherein the alert sound is a sound independent of a rotational frequency of a driving motor for the vehicle, and wherein the cancellation sound signal generator is configured to generate the cancellation sound signal in accordance with the alert sound signal.

11. The active acoustic control apparatus according to claim 3, wherein the alert sound is a sound independent of a rotational frequency of a driving motor for the vehicle, and wherein the cancellation sound signal generator is configured to generate the cancellation sound signal in accordance with the alert sound signal.

12. The active acoustic control apparatus according to claim 4, wherein the alert sound is a sound independent of a rotational frequency of a driving motor for the vehicle, and wherein the cancellation sound signal generator is configured to generate the cancellation sound signal in accordance with the alert sound signal.

13. The active acoustic control apparatus according to claim 9, wherein the alert sound is a sound independent of a rotational frequency of a driving motor for the vehicle, and wherein the cancellation sound signal generator is configured to generate the cancellation sound signal in accordance with the alert sound signal.

14. The active acoustic control apparatus according to claim 10, wherein the alert sound comprises at least one of chimes, a melody, a single tone, a chord sound, and a sound causing the pedestrian to recall a running state of the vehicle.

15. The active acoustic control apparatus according to claim 11, wherein the alert sound comprises at least one of chimes, a melody, a single tone, a chord sound, and a sound causing the pedestrian to recall a running state of the vehicle.

16. The active acoustic control apparatus according to claim 12, wherein the alert sound comprises at least one of chimes, a melody, a single tone, a chord sound, and a sound causing the pedestrian to recall a running state of the vehicle.

17. The active acoustic control apparatus according to claim 13, wherein the alert sound comprises at least one of chimes, a melody, a single tone, a chord sound, and a sound causing the pedestrian to recall a running state of the vehicle.

* * * * *